(12) United States Patent
Daulny et al.

(10) Patent No.: US 11,753,153 B2
(45) Date of Patent: Sep. 12, 2023

(54) LANDING GEAR WITH REINFORCING WEB

(71) Applicant: SAFRAN LANDING SYSTEMS, Velizy Villacoublay (FR)

(72) Inventors: Alexandre Daulny, Moissy-Cramayel (FR); Thierry Blanpain, Moissy-Cramayel (FR); Nicolas Nguyen, Moissy-Cramayel (FR); Yves Courtois de Lourmel, Moissy-Cramayel (FR)

(73) Assignee: SAFRAN LANDING SYSTEMS, Velizy Villacoublay (FR)

( * ) Notice: Subject to any disclaimer, the term of this patent is extended or adjusted under 35 U.S.C. 154(b) by 66 days.

(21) Appl. No.: 17/626,342

(22) PCT Filed: Jul. 10, 2020

(86) PCT No.: PCT/EP2020/069618
§ 371 (c)(1),
(2) Date: Jan. 11, 2022

(87) PCT Pub. No.: WO2021/009065
PCT Pub. Date: Jan. 21, 2021

(65) Prior Publication Data
US 2022/0266993 A1    Aug. 25, 2022

(30) Foreign Application Priority Data

Jul. 12, 2019 (FR) .................................. 1907847

(51) Int. Cl.
*B64C 25/58* (2006.01)

(52) U.S. Cl.
CPC .................................... *B64C 25/58* (2013.01)

(58) Field of Classification Search
CPC ......... B64C 25/02; B64C 25/10; B64C 25/50; B64C 25/58; B64C 25/60
See application file for complete search history.

(56) References Cited

U.S. PATENT DOCUMENTS

| 2007/0007386 A1* | 1/2007 | Coupe | B29C 70/24 244/102 A |
| 2008/0230650 A1* | 9/2008 | Meyer | B64C 25/10 244/100 R |

(Continued)

FOREIGN PATENT DOCUMENTS

| EP | 1736674 A1 | 12/2006 |
| EP | 3269524 A2 | 1/2018 |

(Continued)

OTHER PUBLICATIONS

International Search Report of PCT/EP2020/069618 dated Oct. 5, 2020 [PCT/ISA/210].

*Primary Examiner* — Tye William Abell
(74) *Attorney, Agent, or Firm* — Sughrue Mion, PLLC

(57) ABSTRACT

A landing gear includes structural parts arranged to connect a wheel to a structure of an aircraft, each structural part including two or more interfaces for connection to one or more other of the structural parts or to the structure of the aircraft and two or more webs which extend so as to face one another while delimiting between them a free space and which connect the two interfaces in order to transmit the forces from one to the other.

8 Claims, 6 Drawing Sheets

(56) References Cited

U.S. PATENT DOCUMENTS

2008/0272234 A1* 11/2008 Thulbon ................. B64C 25/50
                                                                244/102 R
2017/0361923 A1* 12/2017 Himmelmann ........ B23K 31/02
2018/0031028 A1*  2/2018 Himmelmann ....... B22F 3/1017

FOREIGN PATENT DOCUMENTS

EP      3275780 A1    1/2018
WO   2006/010890 A1   2/2006

* cited by examiner

LANDING GEAR WITH REINFORCING WEB

CROSS REFERENCE TO RELATED APPLICATIONS

This application is a National Stage of International Application No. PCT/EP2020/069618 filed on Jul. 10, 2020, claiming priority based on French Patent Application No. 1907847 filed on Jul. 12, 2019, the entire contents of each of which being herein incorporated by reference in their entireties.

The present invention relates to the field of aviation and, more particularly, to undercarriages.

BACKGROUND OF THE INVENTION

A landing gear comprises structural parts arranged to connect a wheel to a structure of an aircraft and to withstand and dampen landing forces. Each structural part comprises at least two interfaces for connection to at least one other of the structural parts and to the structure of the aircraft. Each structural part thus transmits force either between two other of the structural parts or between another of the structural parts and the structure of the aircraft.

The main structural part is the strut. The strut generally comprises a tubular body forming the body, or interface, of a shock-absorber whose rod slides in said body and includes an unsuspended free end provided with an axle carrying at least one wheel. A member comprising a first substantially horizontal plate and a second inclined plate extends to either side of the tubular body. The first and second plates have ends secured to the tubular body and ends that meet and to which articulation bearings are fastened defining an articulation axis perpendicular to the tubular body. In the triangular space delimited by the tubular body and the two plates of the member, a rib extends that stiffens the member and its connection to the tubular body so as to prevent it from deforming under the forces to which it is subjected during landing. This structural part, which is obtained by machining a forged part or a rolled plate, is relatively heavy.

OBJECT OF THE INVENTION

A particular object of the invention is a landing gear having a structure that is more lightweight, the material being distributed differently in the available volume, while being mechanically strong.

SUMMARY OF THE INVENTION

To this end, the invention relates to a landing gear comprising structural parts arranged to connect a wheel to a structure of an aircraft and to withstand and dampen landing forces, each structural part comprising at least two interfaces for connection to at least one other of the structural parts or to the structure of the aircraft and at least two webs which extend so as to face one another while delimiting a free space between them and which connect the two interfaces in order to transmit the landing forces from one to the other.

Thus, in at least one of the structural parts of the landing gear of the invention, at least some of the forces are transmitted from one interface to the other by two webs which extend facing each other. The distribution of the material in this structural part means it has a lower mass than a conventional landing gear. The distance between the webs and their thickness will be determined so that the inertia and rigidity of the structural part are adapted to the forces to be withstood in an allocated available volume.

According to a first particular embodiment, the structural part is a strut of the landing gear. The strut comprises a tubular body having two sides opposite each other, from each of which there extends laterally a pair of webs that face each other and that converge towards each other to connect to an articulation bearing articulating the strut to the structure of the aircraft.

The tubular body forms the interface connecting to the rod of the landing gear while the bearings form the interfaces connecting to the structure of the aircraft. The webs transmit forces between these interfaces. The resulting strut is more lightweight than a strut with a conventional structure, but its dimensions can be determined such that it has identical mechanical characteristics.

According to a second embodiment of the invention, the structural part is a brace element, one of the two interfaces comprises two first coaxial articulation bearings articulating the brace element to the aircraft, and the webs are substantially triangular in shape, having two vertices adjacent to the two first bearings, and the other of the interfaces comprises a second articulation bearing articulated with a leg of the landing gear.

Other characteristics and advantages of the invention appear on reading the following description of a particular and non-limiting embodiment of the invention.

BRIEF DESCRIPTION OF THE DRAWINGS

Reference is made to the accompanying drawings, in which.

DETAILED DESCRIPTION OF THE INVENTION

Figure 1:
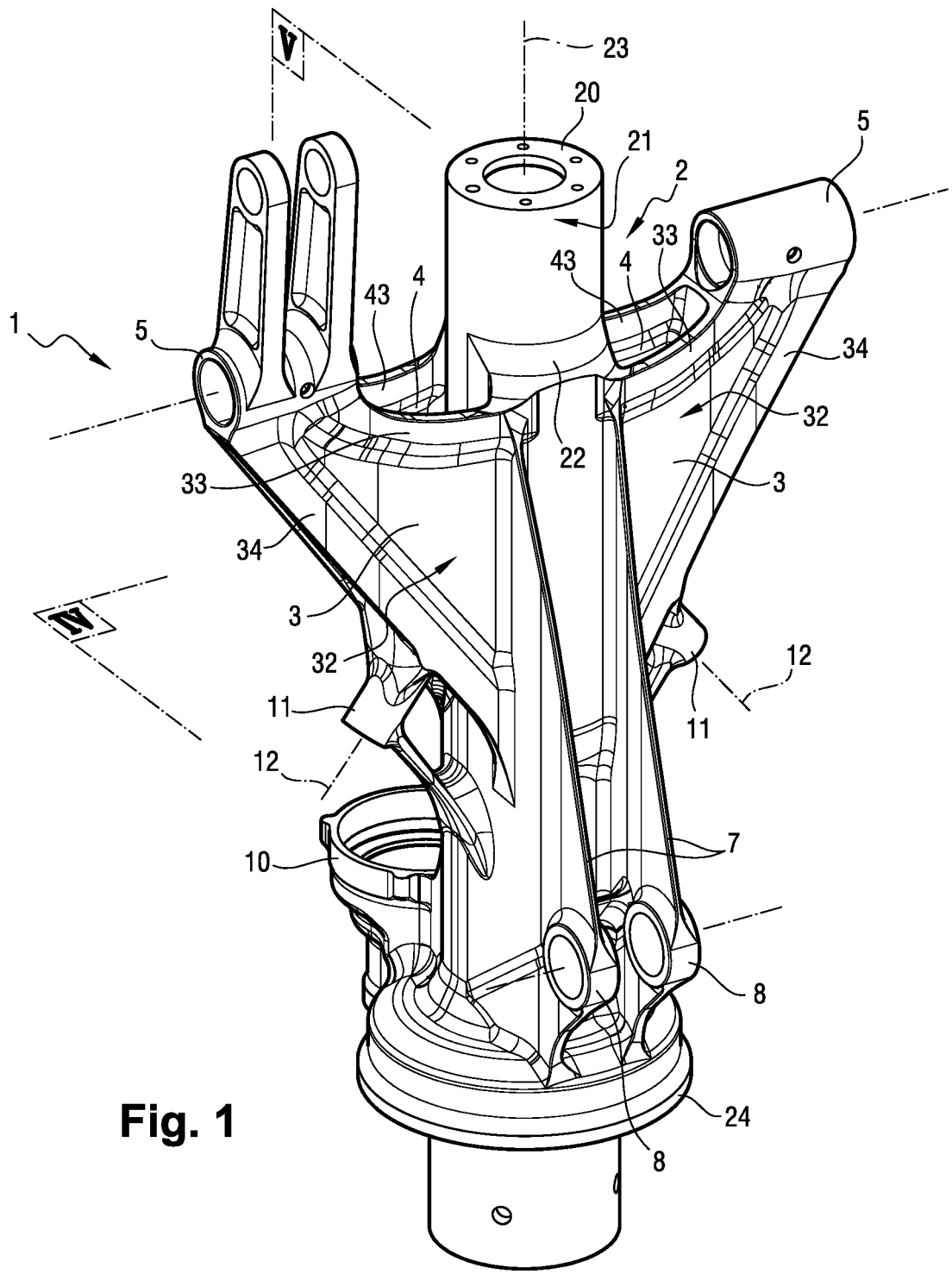
FIG. 1 is a perspective view of a landing gear strut according to the invention.
Figure 2:
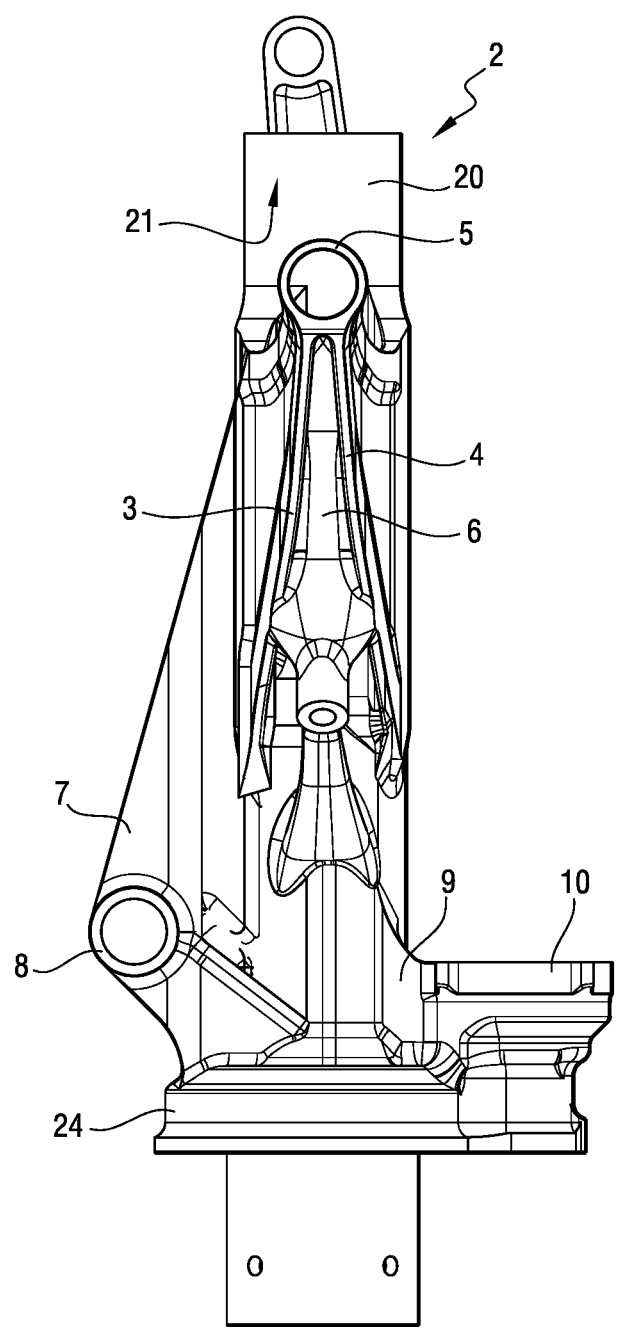
FIG. 2 is a side view of this strut.
Figure 3:
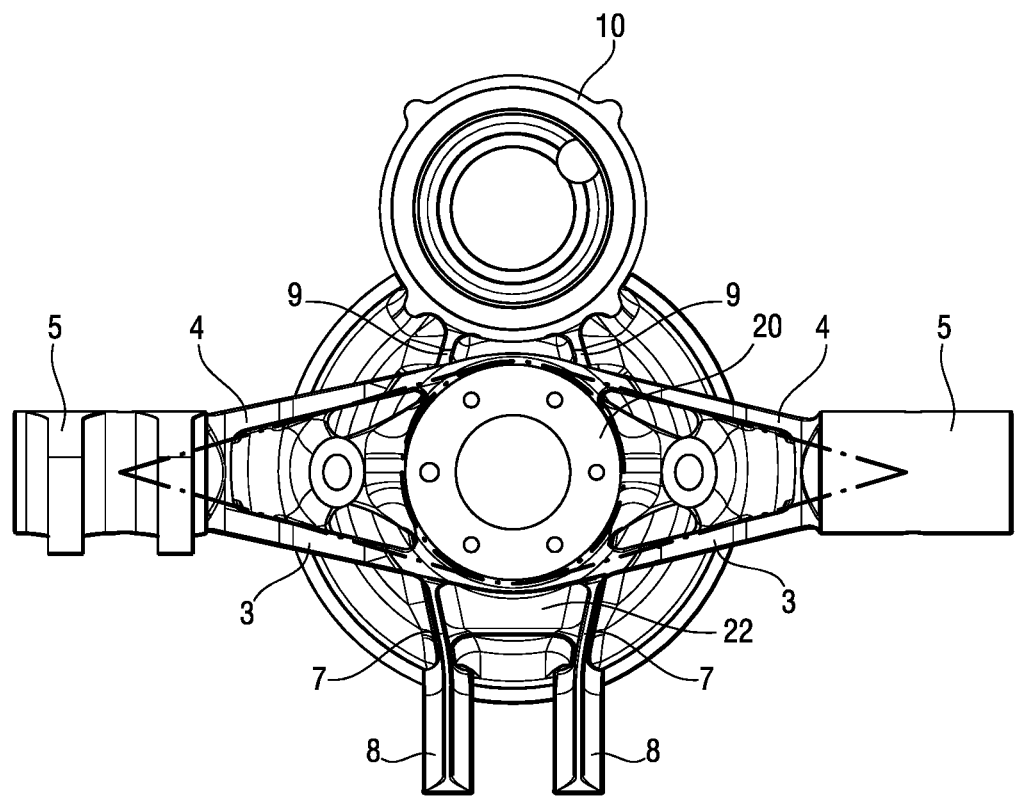
FIG. 3 is a top view of this strut.
Figure 4:
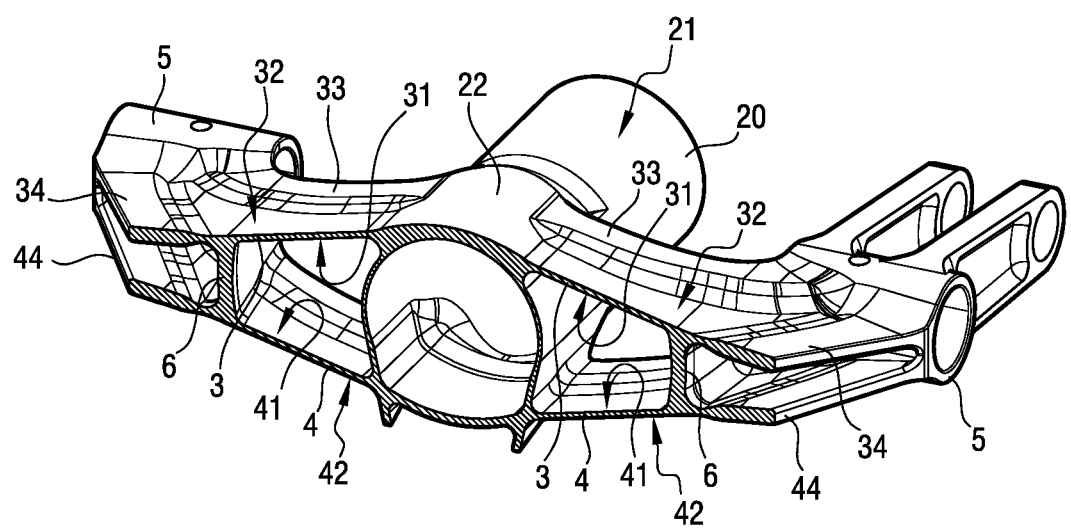
FIG. 4 is a perspective view of this strut in cross section according to the plane IV of FIG. 1.
Figure 5:
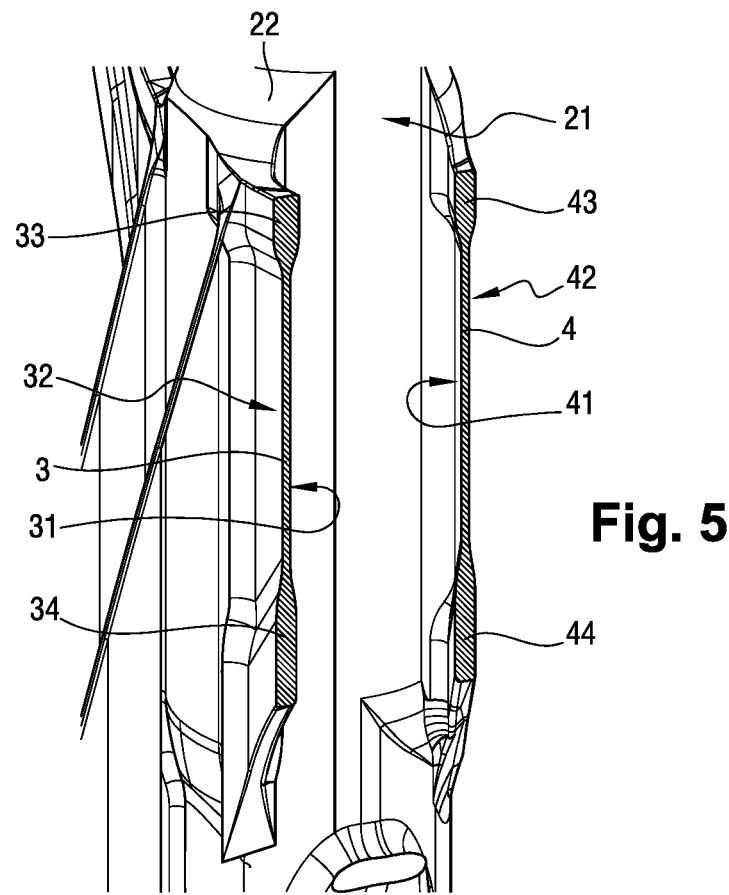
FIG. 5 is a view of this strut in cross section according to the plane V of FIG. 1.
Figure 6:
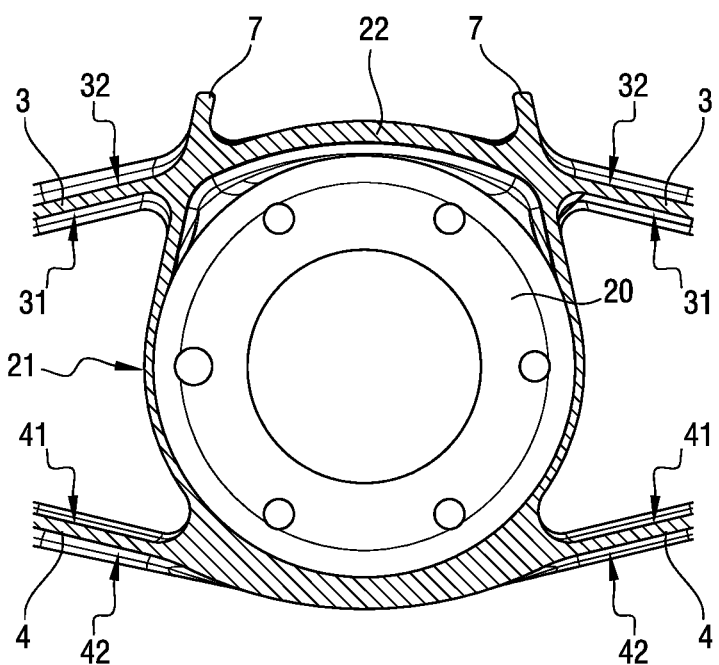
FIG. 6 is an enlarged view of the central part of FIG. 3.
Figure 7:
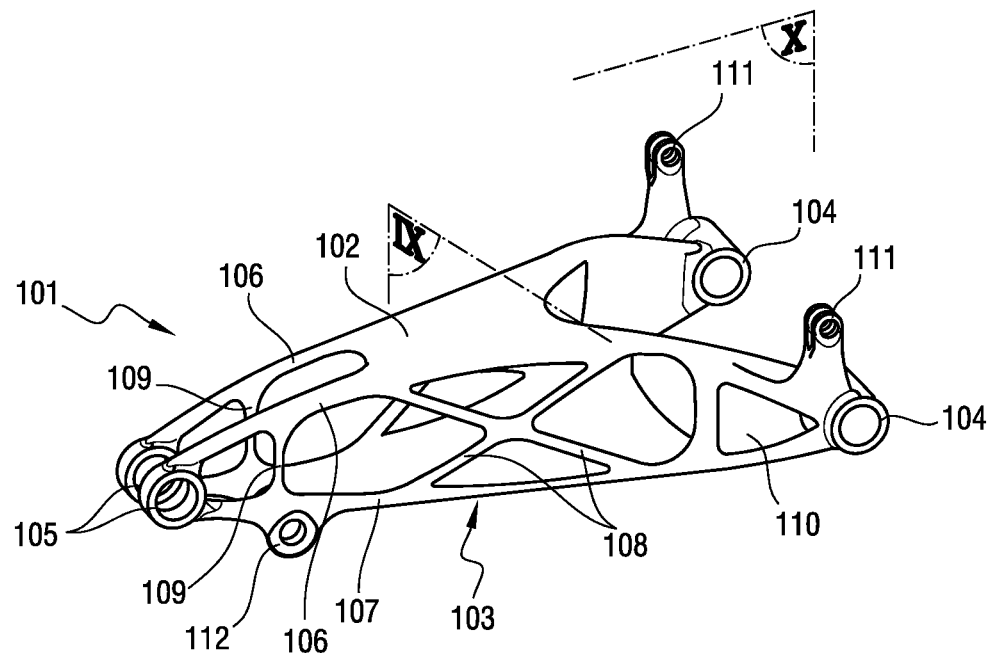
FIG. 7 is a perspective view of a brace element according to the invention.
Figure 8:
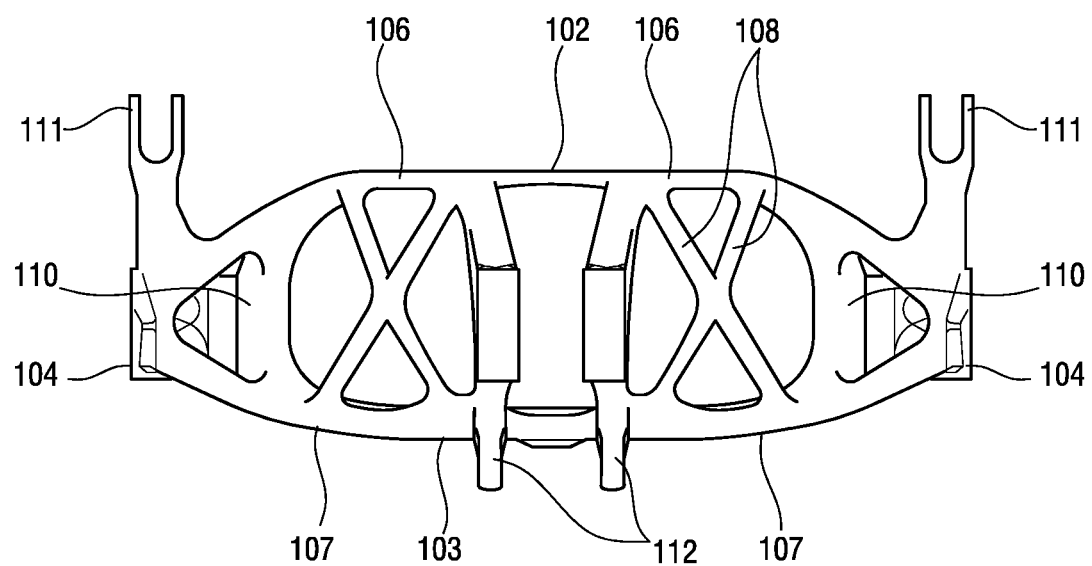
FIG. 8 is an end view of this brace element.
Figure 9:
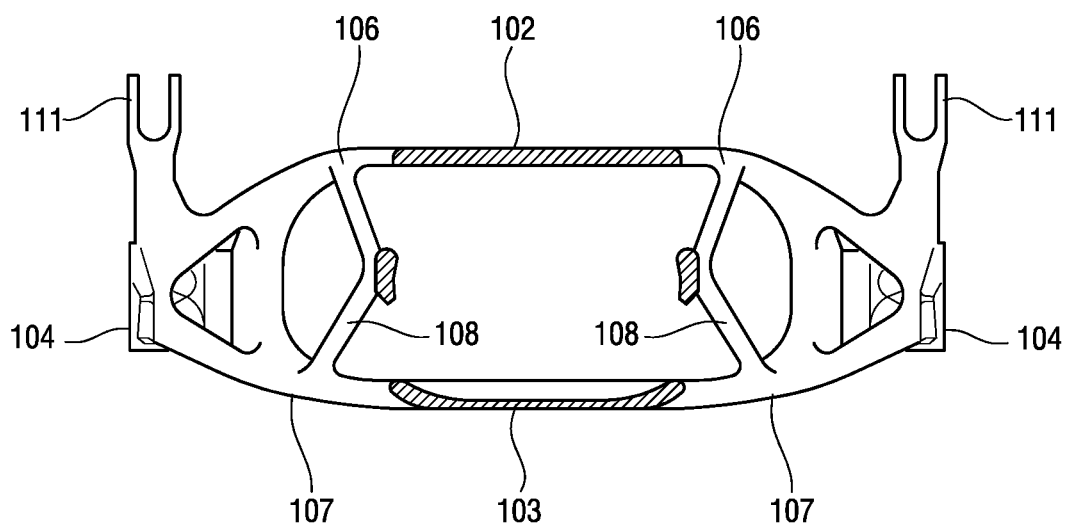
FIG. 9 is a view of this brace element in cross section according to the plane IX of FIG. 7.
Figure 10:
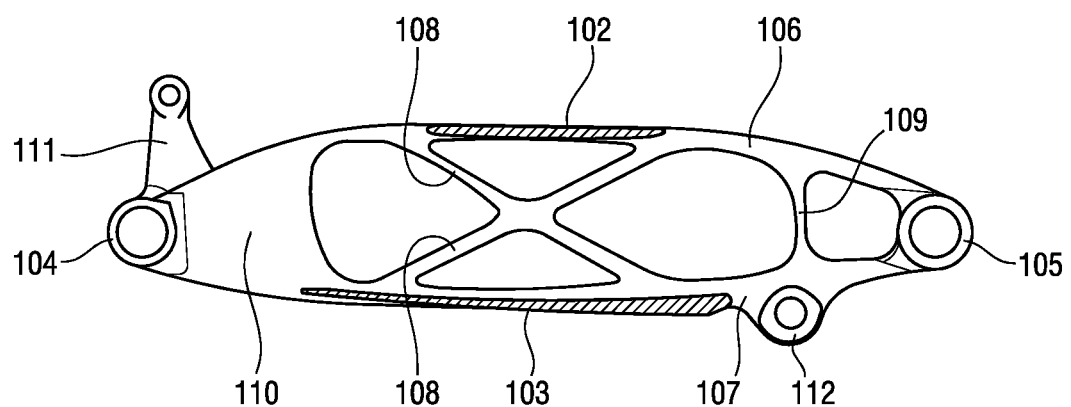
FIG. 10 is a view of this brace element in cross section according to the plane X of FIG. 7.

The invention relates to a landing gear incorporating a strut which comprises a tubular body forming the body, or the support, of a shock-absorber whose rod slides in said body and includes a free end provided with an axle carrying wheels. In a manner known per se, the strut is articulated to the structure of the aircraft so as to be movable between an extended position used for the ground manoeuvres of the aircraft and a retracted position in a hold of the aircraft, this latter position being used when the aircraft is flying.

With reference to FIGS. 1 to 6, the landing gear strut, given overall reference 1, comprises a tubular body, given overall reference 2, having two sides opposite each other, from each of which there extends laterally a pair of webs 3, 4 that face each other and that converge towards each other to connect to an articulation bearing 5 articulating the strut 1 to the structure of the aircraft. The strut 1 thus forms an interface connecting to the rod of the landing gear and the bearings 5 each form an interface connecting to the structure of the aircraft.

The tubular body 2 comprises a sleeve 20 having a substantially cylindrical external surface 21 and at least one solid mass 22 projecting from said external surface 21. The solid mass 22 extends parallel to a central axis 23 of the tubular sleeve 20 and symmetrically with respect to the pairs of webs 3, 4. The central axis 23 is perpendicular to and coplanar with the central axes of the bearings 5.

In this instance, the webs 3, 4 of each pair of webs 3, 4 are substantially triangular in shape, with one side secured to the tubular body 2 and, on the opposite side, a vertex secured to the bearing 5. The webs 3, 4 of each pair of webs 3, 4 therefore have two free sides not connected to the tubular body 2, namely a substantially horizontal free side and an oblique free side. The webs 3, 4 of each pair of webs 3, 4 thus have inner surfaces 31, 41 which are spaced apart from each other by a distance which decreases from the tubular body 2 to the bearing 5, the webs 3 and 4 of each pair of webs 3, 4 converging towards the bearing 5.

The side of the web 3 of each pair of webs 3, 4 that is secured to the tubular body 2 is connected to said solid mass 22 so that the inner surface 31 of the web 3 is tangential to a theoretical outer shell of the sleeve 20 in line with the solid mass 22. The outer surfaces 32 of the webs 3 extend in continuation of each other.

The side of the web 4 of each pair of webs 3, 4 secured to the tubular body 2 is connected to the sleeve 20 so that the outer surface 42 of the web 4 is tangential to the external surface 21 of the sleeve 20.

The substantially horizontal free side and the oblique free side of the webs 3, 4 are each provided with a peripheral extra thickness 33, 34, 43, 44 respectively. This extra thickness 33, 34, 43, 44, which extends along each free side of the webs 3, 4, has the function of stiffening the webs 3, 4.

The strut 1 comprises a rib 6 having two opposite edges secured to the webs 3, 4 of each pair of webs 3, 4 so as to extend transversely thereto. The rib 6 has one end that touches the bearing 5 and an opposite end that meets the extra thickness 34, 44.

The tubular body 2 comprises an outer flange 24 secured to the lower end of the sleeve 20 (lower when the strut 1, mounted on the aircraft, is in the extended position as shown in FIG. 1). The solid mass 22 touches the flange 24.

The strut 1 also comprises two first ribs 7 facing each other which project from the solid mass 22 of the sleeve 20, perpendicular to a general plane of the webs 3, 4 and parallel to the central axis 23 of the sleeve 20. The first ribs 7 leave a free space between them and connect a brace strut bearing 8 to the sleeve 20 of the tubular body 20. In this example, the brace strut bearing 8 is in two separate sections, each first rib 7 carrying one of the sections. The first ribs 7 have a first end connected to the outer flange 24 and, at the opposite end, a second end touching the extra thicknesses 33 of the webs 3 where the webs 3 join the solid mass 22. Each first rib 7 has, opposite the sleeve 20, an edge comprising a first inclined section that extends from the second end of the first rib 7 in contact with the solid mass 22 to the top of the bearing 8 (i.e., the portion of the outer surface of the bearing 8 furthest from the central axis 23 of the sleeve 20) and a second inclined section extending from the top of the bearing 8 to the first end in contact with the outer flange 24. It should be noted that the solid mass 22 helps stiffen the sleeve 20 and locally increase the strength of the sleeve 20 at the location where the brace strut applies forces thereto. The first ribs 7 distribute stresses along the entire length of the solid mass 22.

The strut 1 comprises two second ribs 9, facing each other, which project from the external surface 21 of the sleeve 20 of the tubular body 2 perpendicular to a general plane of the webs 3, 4, leaving between them a free space, and which connect a steering actuator support 10 to the tubular body 2. The second ribs 9 and the steering actuator support 10 are connected to the outer flange 24. The steering actuator, not shown in the figures, is in this instance a rotary actuator, for example an electric gear motor, and the steering actuator support 10 is a ring belonging to the strut 1 and having a central axis parallel to the central axis 23 of the sleeve 20 so that the gear motor accommodated in the support 10 has an output axis parallel to the central axis 23. It should be noted that the webs 3, 4 of each pair of webs 3, 4 define, with the tubular body 2, a cavity for hydraulic ducts and/or cables (not shown) to pass through. These hydraulic ducts and/or cables are used in this instance for supplying power to the steering actuator. More particularly, in the event that the invention is applied to a main landing gear, these hydraulic ducts and/or cables may be used for the device for braking the wheels of the landing gear and also for supplying power to a motor for rotating the wheels, such a motor being used for taxiing manoeuvres.

It should be understood that the use of pairs of ribs for connecting the brace strut bearing 8 and the support 10 to the sleeve 20 helps limit the weight of the strut 1, the ribs of each pair of ribs leaving a space between them that contains no material.

The strut 1 also comprises two bushings 11 each passing through one of the ribs 6 and having a central axis 12 oblique to the central axis 23 of the sleeve 20 of the tubular body 2. The central axes 12 of the bushings 11 and the central axis 23 of the sleeve 20 of the tubular body 2 extend in the same midplane of the tubular body 2. The bushings 11 form interfaces connecting to connecting rods for actuating doors between two positions relative to the structure of the aircraft.

Preferably, the strut 1 is obtained by additive manufacturing. Determining the dimensions of the strut such that it withstands the forces at play in a landing gear is within the abilities of a person skilled in the art. Thus, the spacing between the webs and their thickness will in particular be defined depending on the desired moment of inertia.

With reference to FIGS. 7 to 10, the invention is described in application to a brace element.

The brace element of the landing gear, given overall reference 101, comprises a pair of webs 102, 103 that face each other and that are substantially triangular in shape, having two vertices that are each adjacent to a first articulation bearing 104 articulating the brace element 101 to the structure of the aircraft, and a third vertex that is adjacent to a second bearing 105. The bearings 104 are coaxial and the bearing 105 is in this instance divided into two separate sections.

The brace element forms a structural part that transmits force between the bearings 104 and 105 that form interfaces connecting the brace element to the parts that surround it.

Each of the webs 102, 103 has two sides, each formed by a beam 106, 107 extending between one of the first bearings 104 and the second bearing 105. Each beam 106, 107 thus connects one of the first bearings 104 and the second bearing 105.

Each beam 106 of each web 102 is connected to the beam 107 of the other web 103 facing it by crossmembers 108, 109. Each beam 106 is thus connected to the beam 107 facing it by:

two crossmembers 108 which are inclined with respect to the beams 106, 107 so as to cross substantially at their middle, and which are connected together at their middle;

a crossmember 109 which is substantially perpendicular to the beam 107 in the vicinity of the second bearing 105.

The beams 106, 107 have end sections that converge towards the first bearing 104. Said end sections that face each other are connected together by a portion of the wall 110 that extends up to the bearing 104 at a point that is spaced apart from the points of connection to the end sections of the beams 106 and 107 according to the articulation axis. The wall 110 thus acts as a rib opposing:

a modification of the spacing between the beams 106, 107 facing each other, and a modification of the angle of the articulation axis of the first bearing 104.

It should be noted that said end section of each of the beams 106 carries an actuating lever 111 in the vicinity of the first bearing 104.

Each beam 107 carries a third bearing 112 in the vicinity of the point of connection of the beam 107 to the crossmember 109.

Preferably, the brace element 101 is obtained by additive manufacturing. Determining the dimensions of the brace element 101 such that it withstands the forces at play in a landing gear is within the abilities of a person skilled in the art. Thus, the spacing between the webs and their thickness will in particular be defined depending on the desired moment of inertia.

Naturally, the invention is not limited to the embodiment described, but covers any variant coming within the ambit of the invention as defined by the claims.

In particular, although the strut and the brace element have in this instance been described as being manufactured using an additive manufacturing process, the strut and the brace element can be manufactured by any means and, for example, by mechanically welded construction or by moulding.

Although the strut and the brace element have in this instance been described as being made as a single piece, the strut and the brace element may comprise several parts assembled together, for example by welding, bolting, gluing, force fitting, etc.

Although the articulation bearing of the brace strut is in this instance made as two pieces, this bearing may be made as a single piece.

Although the support 10 is in this instance arranged to receive a rotary steering actuator, the support 10 could comprise a bushing with an axis perpendicular to the central axis 23 in order to receive a linear steering actuator.

Although the invention has been described in this instance in application to a landing gear strut and to a brace element, the invention is applicable to any structural part of a landing gear and, for example, a brace strut, a connecting rod, etc. The structural part in question may comprise one or more interfaces connecting to the aircraft and one or more interfaces connecting to one or more other structural parts, or interfaces connecting only to other structural parts. The structural part may have one of the two interfaces formed by two first coaxial articulation bearings articulating the structural part to the aircraft, and the webs are substantially triangular in shape, having two vertices adjacent to the two first bearings.

The shape of the tubular body 2 may be different to that shown; with or without a solid mass, or a solid mass extending over all or part of the length of the sleeve, or two diametrically opposed solid masses to which the two webs of each pair of webs are connected; with or without an outer flange; with or without first ribs, or with first ribs of a different shape; with or without second ribs, or with second ribs of a different shape; with or without a bushing 11, etc.

The inner surface 31 of the web 3 may be spaced apart from the theoretical outer shell of the sleeve 20 in line with the solid mass 22.

Rather than being tangential to the external surface 21 of the sleeve 20, the webs 3, 4 could intersect said outer surface 21.

The invention claimed is:

1. A landing gear comprising structural parts arranged to connect a wheel to a structure of an aircraft and to withstand landing forces, each structural part comprising at least two interfaces connecting to at least one other of the structural parts or to the structure of the aircraft, and one of the structural parts (1, 101) is a brace element characterized in that it comprises at least two webs (3, 4; 102, 103) which extend so as to face one another while delimiting between them a free space and which connect the two interfaces in order to transmit the forces from one to the other, in that one of the two interfaces comprises two first coaxial articulation bearings (5; 104) for articulating the structural part (1, 101), and the webs (3, 4; 102, 103) are substantially triangular in shape, having two vertices adjacent to the two first bearings, and the other of the interfaces comprises a second articulation bearing (105) for articulating the bracing element, and in that each of the webs (102, 103) has two sides formed by a beam (106, 107) extending between one of the first bearings (104) and the second bearing (105).

2. The landing gear according to claim 1, wherein at least one of the webs (3, 4) comprises a peripheral extra thickness (33, 34, 43, 44).

3. The landing gear according to claim 1, comprising a rib (6) having two opposite edges secured to the webs (3, 4) so as to extend transversely thereto.

4. The landing gear according to claim 1, wherein the structural part is obtained by additive manufacturing.

5. The landing gear according to claim 1, wherein each beam (106, 107) of each web (102, 103) is connected to the beam (107, 106) of the other web (103, 102) facing it by crossmembers (108, 109).

6. The landing gear according to claim 5, wherein each beam (106, 107) of each web (102, 103) has an end section in the vicinity of the first bearing (104) and the end sections of the beams facing each other are connected together by a wall (110).

7. The landing gear according to claim 5, wherein the crossmembers comprise inclined crossmembers (108).

8. The landing gear according to claim 7, wherein each beam (106, 107) of each web (102, 103) has an end section in the vicinity of the first bearing (104) and the end sections of the beams facing each other are connected together by a wall (110).

* * * * *